Aug. 10, 1937.  J. McBRIDE  2,089,393
SIGNALING DEVICE FOR AUTOMOBILES
Filed June 27, 1936   2 Sheets-Sheet 1

Inventor
James McBride

By Clarence A. O'Brien
Hyman Berman
Attorneys

Aug. 10, 1937.   J. McBRIDE   2,089,393
SIGNALING DEVICE FOR AUTOMOBILES
Filed June 27, 1936   2 Sheets—Sheet 2

Inventor
James McBride

By *Clarence A. O'Brien*
*Hyman Berman*
Attorneys

Patented Aug. 10, 1937

2,089,393

UNITED STATES PATENT OFFICE 2,089,393

SIGNALING DEVICE FOR AUTOMOBILES

James McBride, Brimley, Mich.

Application June 27, 1936, Serial No. 87,789

1 Claim. (Cl. 116—52)

This invention relates to a signaling apparatus particularly to a manually operated mechanical signal device designed primarily for use in connection with automotive vehicles, and an object of the invention is to provide a device of this character characterized by simplicity of construction and arrangement of parts, and which can be conveniently and easily operated.

The invention together with its objects and advantages will be best understood from a study of the following description taken in connection with the accompanying drawings wherein:—

Figure 1:
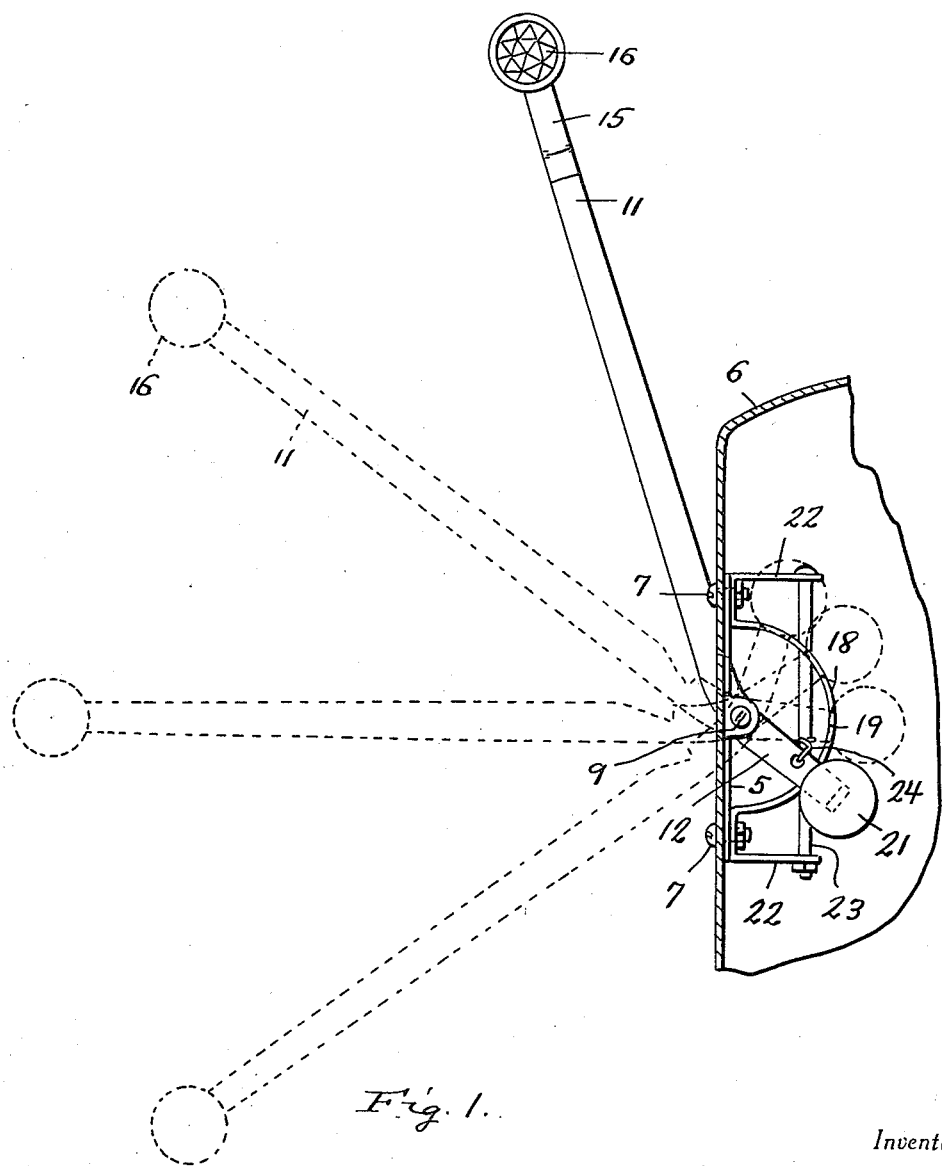
Figure 1 is a detail view mostly in elevation illustrating the application of the invention.

Referring to the drawings by reference numerals it will seen that in the preferred embodiment thereof the signal comprises an attaching plate 5 that is bolted or otherwise secured to one side of the cowl section of the automobile interiorly of the cowl as at 7.

Intermediate its ends the plate 5 has struck out therefrom spaced ears 8 that are apertured to accommodate a pivot bolt 9 equipped with a nut 10.

A signaling arm 11 has a curved end 12 provided with an opening to accommodate the bolt 9 whereby the arm 11 is mounted for vertical swinging movement through aligned slots 13 and 14 provided respectively in the plate 5 and an adjacent side of the cowl 6.

On its outer free end thereof the arm 11 is provided with a head 15 in the form of a fork the shank of which presents an internally threaded socket that is threaded onto the threaded free end of the arm 11. On each of the arms of the fork there is secured a "bull's eye" or reflector element 16 through the medium of bolt and nut means or otherwise as at 17. In the present instance each "bull's eye" 16 is in the form of a glass member provided with a plurality of faces to reflect light rays directed thereto.

Secured to the plate 5 through the aforementioned bolts 7 is an arcuate bar 18 provided with notches 19 which are selectively engaged by the arcuate end 12 of the arm 11 to secure the arm 11 at the desired signaling position.

The arcuate end 12 of the arm merges into a lateral handle 20 equipped with a knob 21 which will be arranged within convenient reach of the operator so that the arm 11 may be conveniently manipulated for giving the desired signal.

The arm 11 is mounted on the bolt 9, and the slots 13 and 14 are of such a width as to permit sufficient "play" for the arm 11 in order that the latter may be moved laterally away from the bar 18 to disengage the end 12 from a notch 19 in the bar as will of course be necessary to permit the arm 11 the desired freedom of movement.

Figure 2:
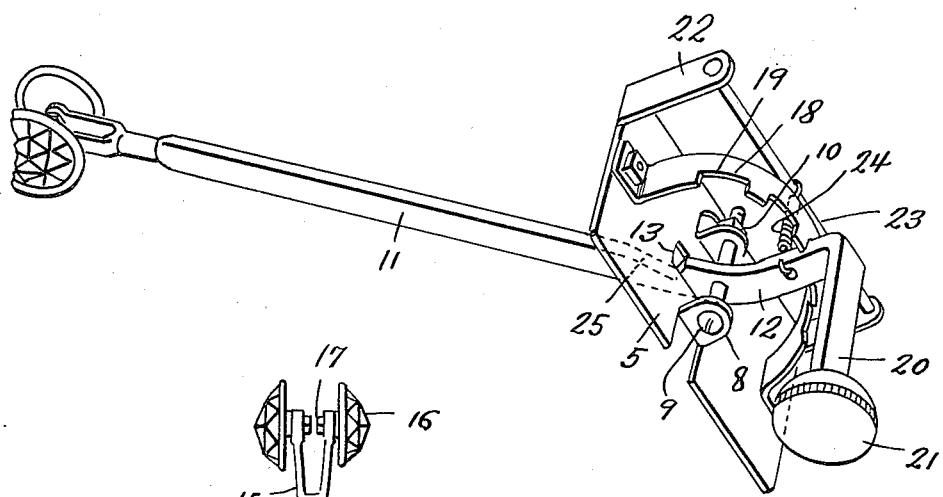
Figure 2 is a perspective view of the signal device per se.
Figure 3:
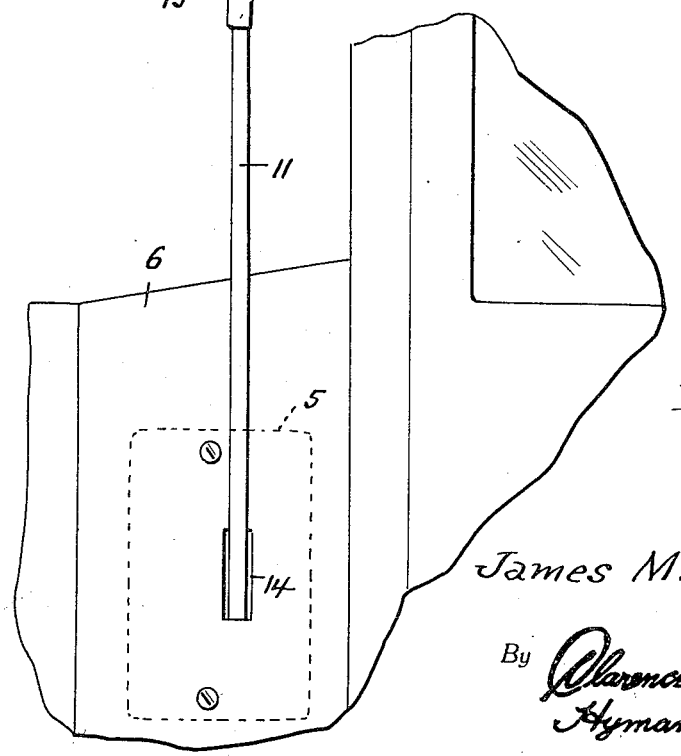
Figure 3 is a side elevational view illustrating the application of the device to an automobile.

Plate 5 has extending from opposite corners thereof lugs 22 which support therebetween a rod 23 with which is engaged one end of a spring 24, the other end of which is suitably engaged with the arcuate portion 12 of the arm 11 for normally urging the arm inwardly into engagement with a notch 19 of the bar 18 as shown in Figure 2.

To permit the arm 11 to swing to the full line position shown in Figure 1, the arm adjacent the curved end 12 is provided with a suitable notch 25.

It will be apparent that with the signal device mounted as described and illustrated the arm 11 may be easily manipulated and swung to either of the dotted line positions shown in Figure 1 or to the full line position shown in said figure to indicate the intention of the operator with respect to making a turn either to the right or to the left, or to stop, as the case may be.

It is thought that a clear understanding of the construction, utility and advantages of an invention of this character will be had without a more detailed description.

Having thus described the invention what is claimed as new is:—

A signaling device of the character described comprising a plate provided with a slot and a pair of ears struck up therefrom and extending laterally of the center face of the plate at opposite side edges of the slot, a pivot member supported by and between said ears, a signaling arm on the outer face of the plate and having an arcuate end working through said slot to the outer face of the plate and mounted on said pivot member for movement pivotally and axially thereof, an arcuate bar secured to said plate on the inner face thereof and provided with a plurality of notches with a selected one of which the arcuate end of said arm is engageable for securing the arm at the desired position of angular adjustment, the slot in said plate being of such width that the said arcuate end of the arm is movable to and from contact with the arcuate bar, a spring member connected at its respective opposite ends with said arcuate end of said signaling arm and the plate for yieldably holding the arm against the bar, and said arm at the inner terminal of the said arcuate end having a lateral handle extension to facilitate the movement of the arm manually to different positions of angular adjustment against the resistance of said spring member, a lateral handle extension to facilitate movement of the arm manually to different positions of angular adjustment against the resistance of said spring member.

JAMES McBRIDE.